P. KESTNER.
PROCESS OF CRYSTALLIZING SUGAR.
APPLICATION FILED APR. 19, 1909.
989,366.
Patented Apr. 11, 1911.
6 SHEETS—SHEET 4.
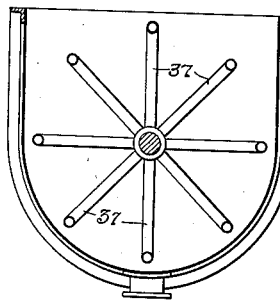
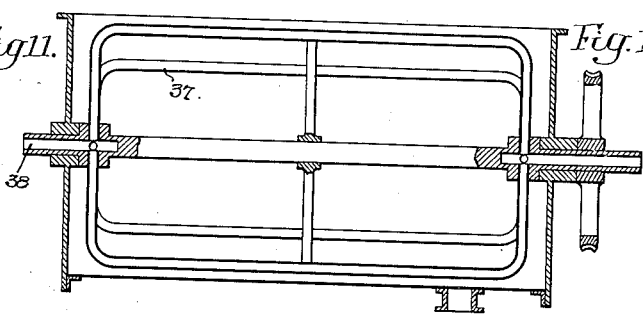
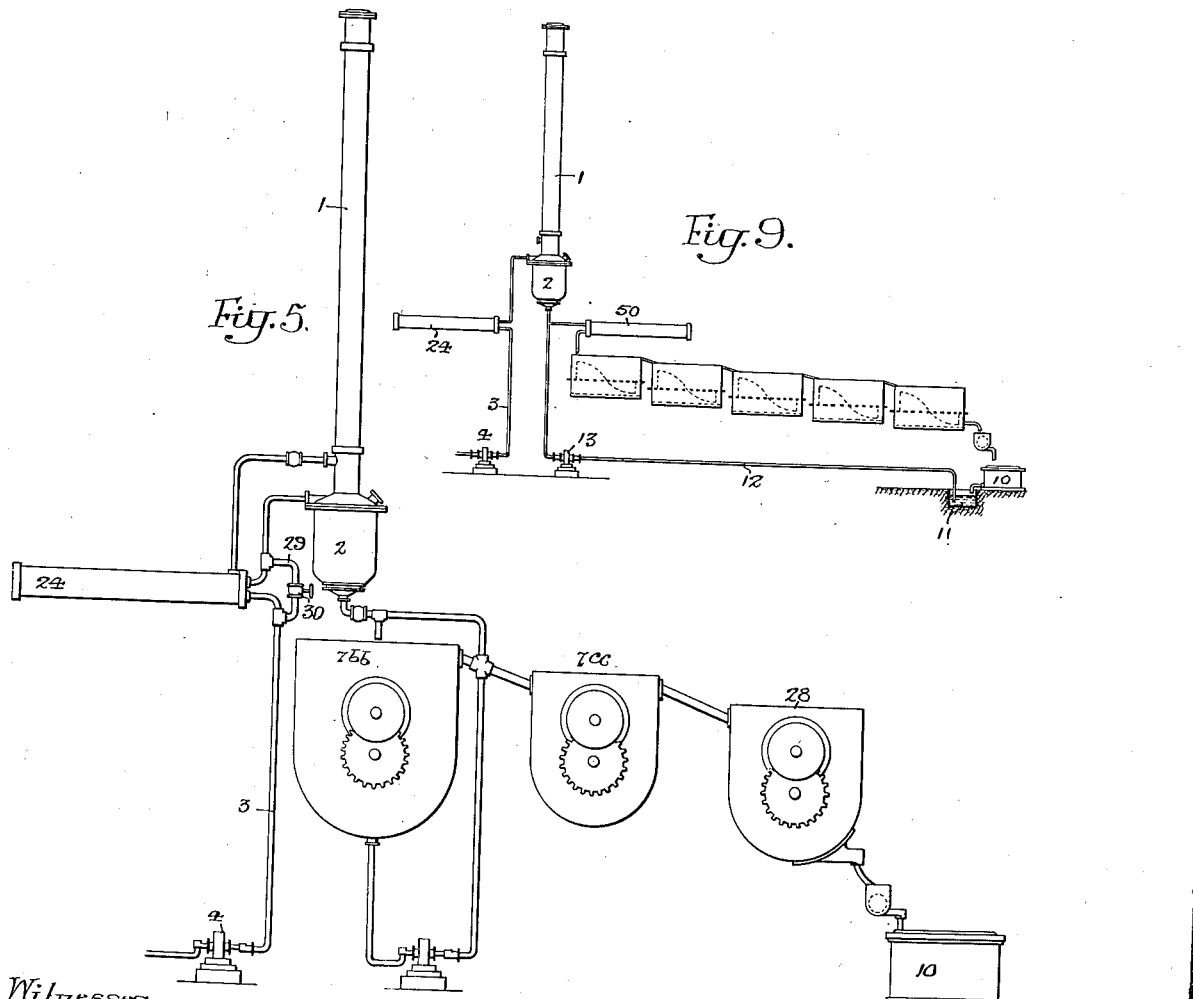
Witnesses.
William H. Pivovar.
Willa A. Burrowes.
Inventor.
Paul Kestner.
by his Attorneys
Howson & Howson

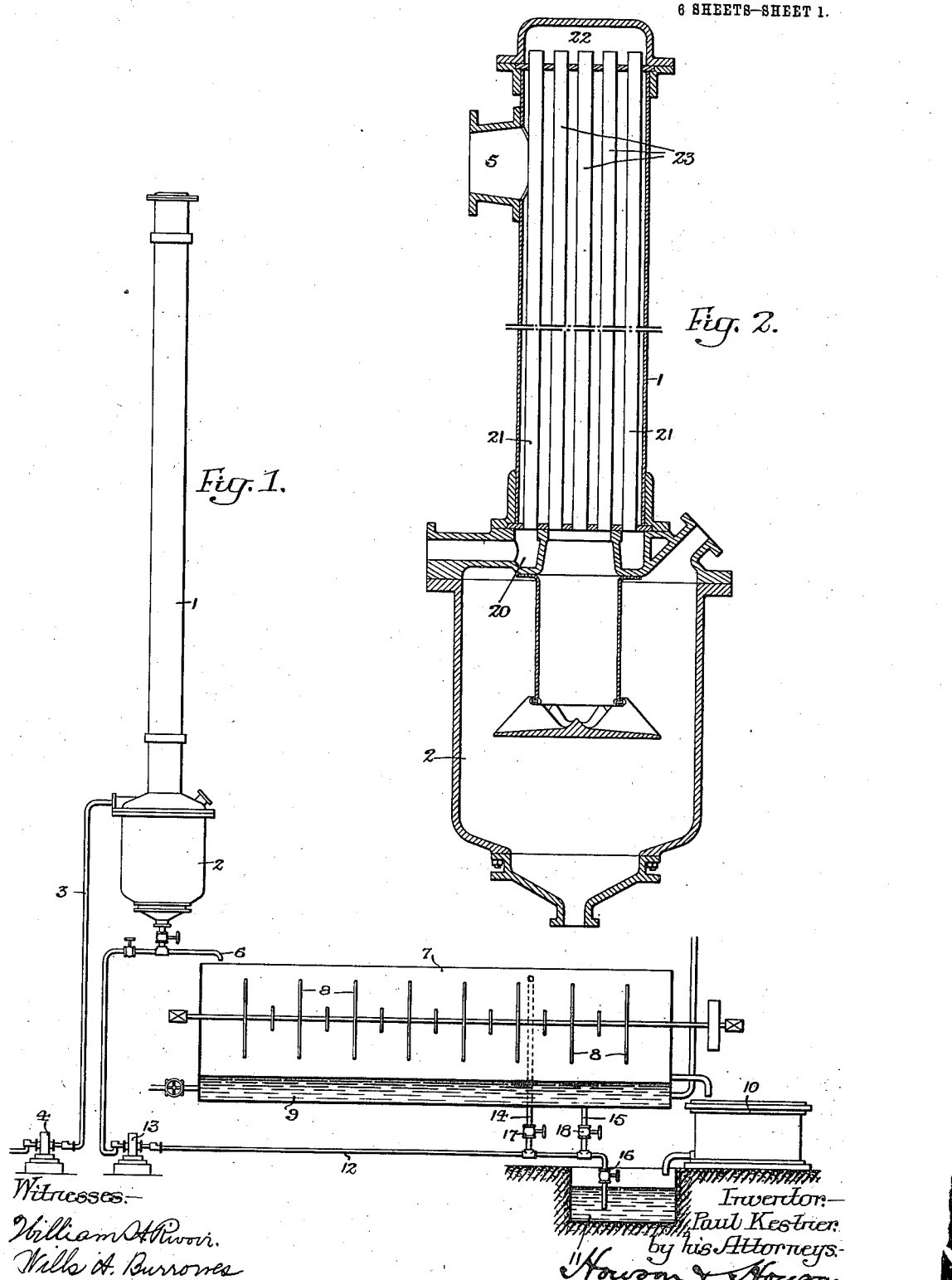

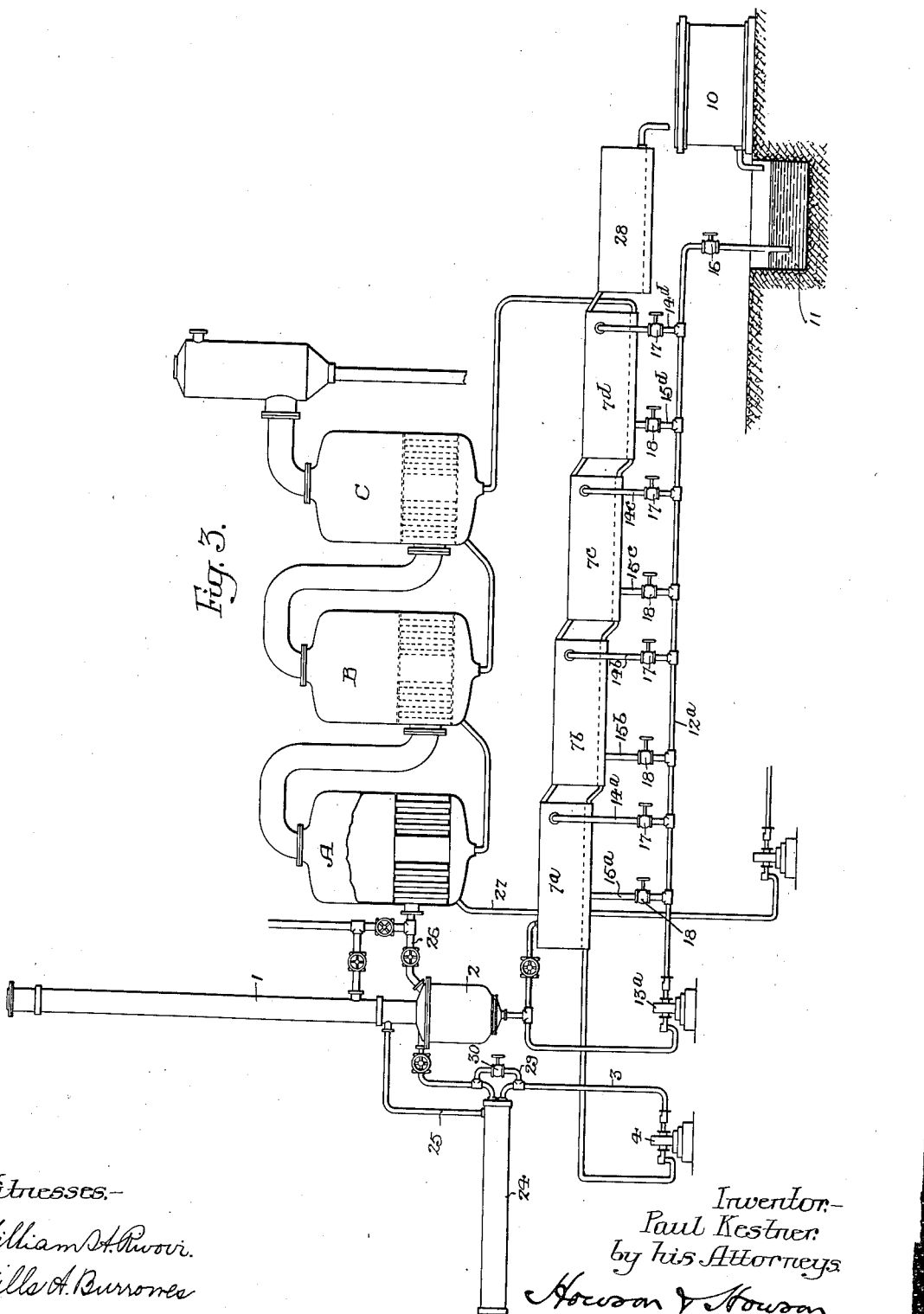

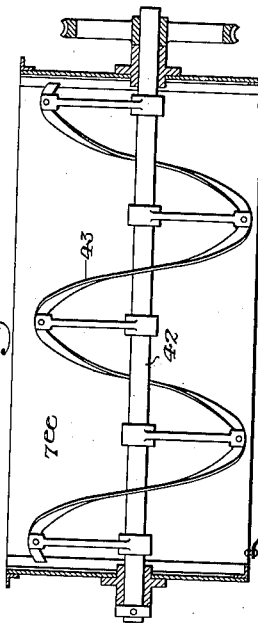
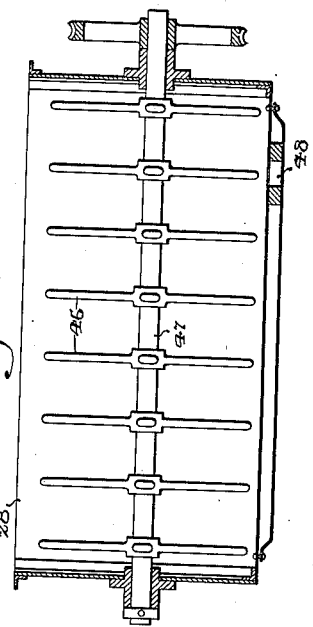
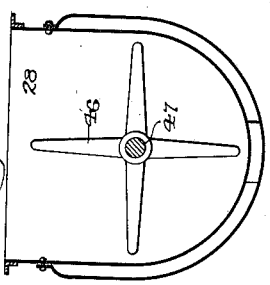
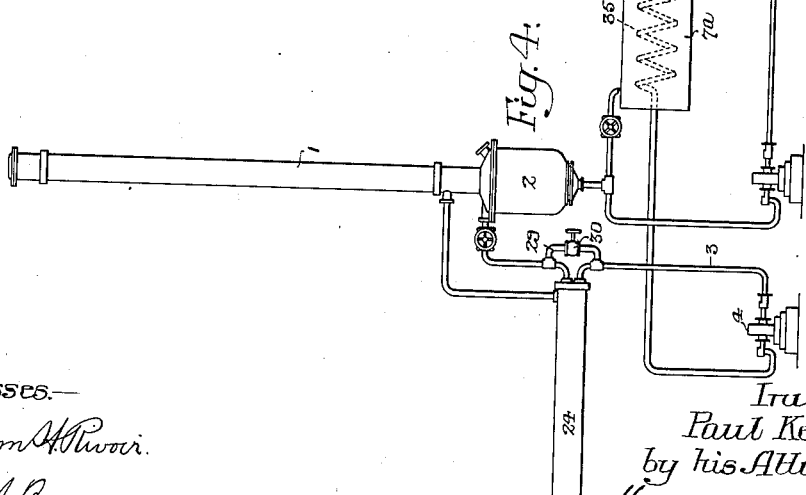

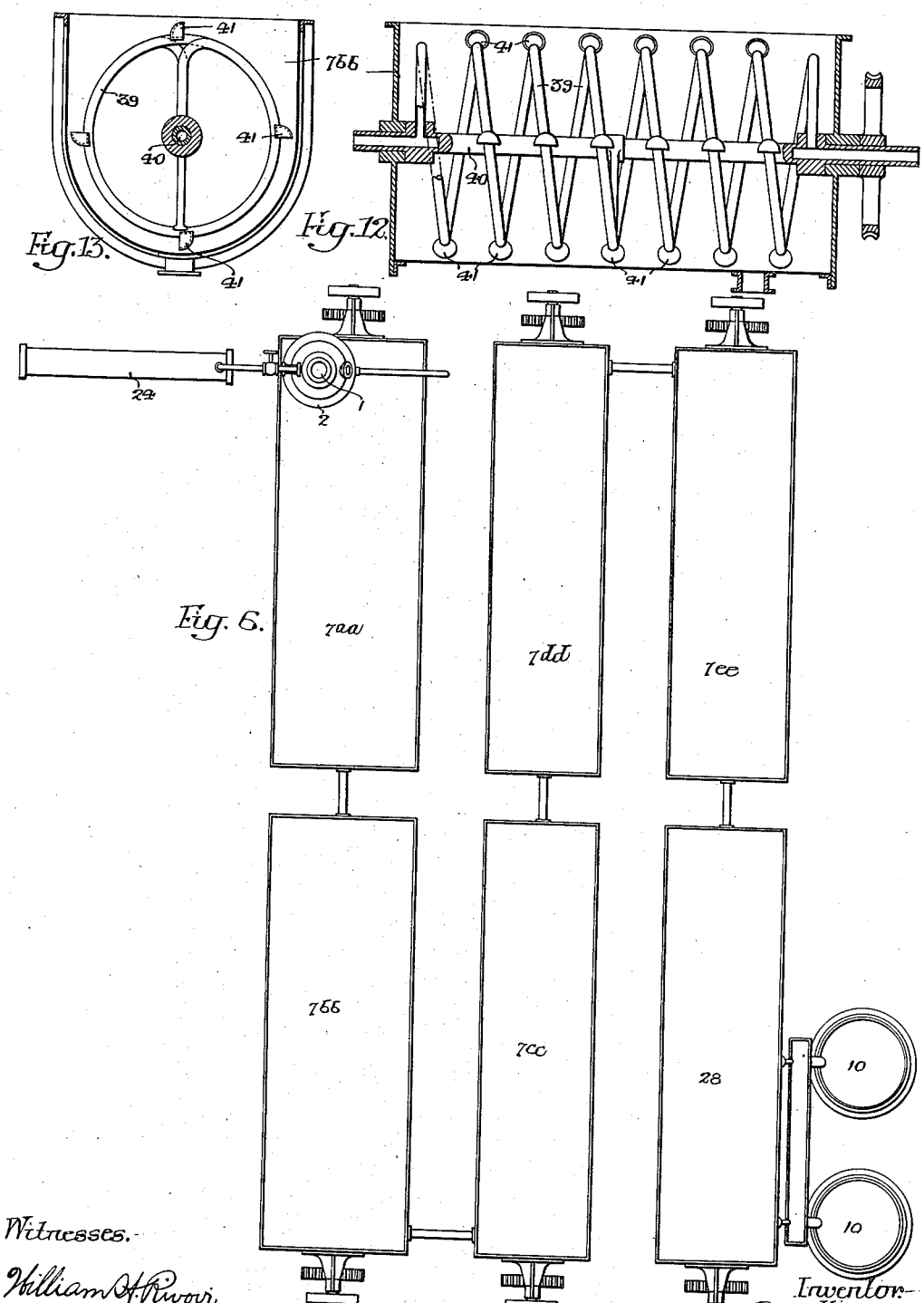

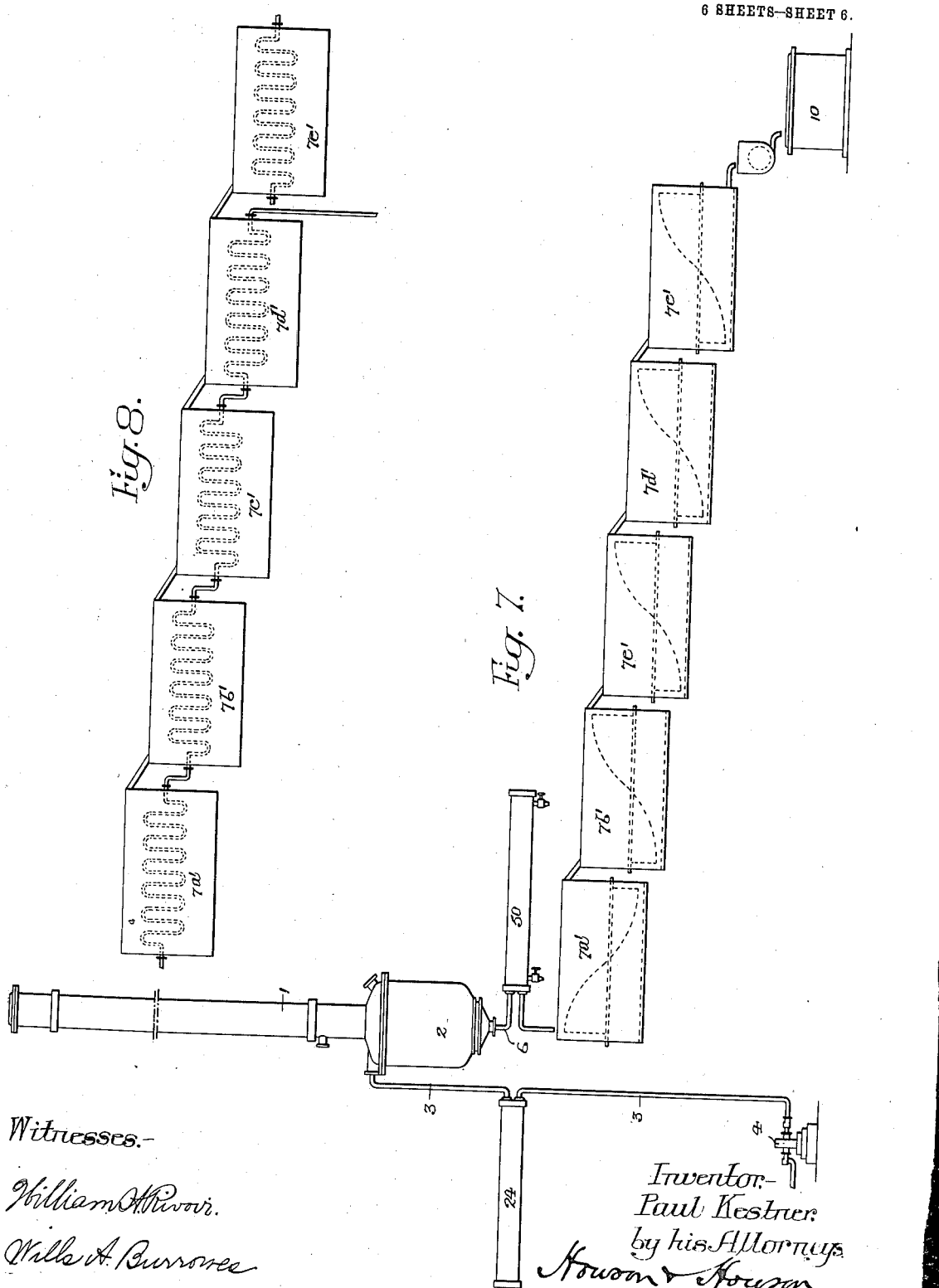

UNITED STATES PATENT OFFICE.

PAUL KESTNER, OF LILLE, FRANCE.

PROCESS OF CRYSTALLIZING SUGAR.

989,366.          Specification of Letters Patent.    Patented Apr. 11, 1911.

Application filed April 19, 1909. Serial No. 490,803.

*To all whom it may concern:*

Be it known that I, PAUL KESTNER, a citizen of the Republic of France, and a resident of Lille, Department Nord, France, have invented certain Improvements in the Process of Crystallizing Sugar, of which the following is a specification.

The improvements which are the subject of my invention relate to a process of crystallizing sugar which comprises evaporating sugar syrup to a high density and at such a temperature that no crystals are formed during concentration, and then in methodically causing the syrup thus obtained to crystallize by lowering the temperature.

My invention further comprises a method of producing sugar from sugar-containing liquids and juices in large and uniform crystals wherein a preliminarily concentrated sugar juice is rapidly raised to a relatively high temperature and dense state of concentration or thickness, is then mixed with a suitable sugar liquor of a less degree of purity and a methodical building up of crystal granules is performed therein; all as more fully hereinafter set forth and as claimed.

The object of my improvements is to avoid the difficulties met up to the present time in the crystallization of sugar. These difficulties are, on the one hand, the danger of the decomposition of the constituents of the syrup at the high temperature at which it is necessary to work; and, on the other hand, the production of a fine grain mixed with the normal grain, which, among other inconveniences, renders purging difficult.

In the concentration of sugar containing juices, it is usually assumed that exposure to temperatures as high as even 100° C. is dangerous, and for this reason the older methods of evaporating at atmospheric pressure have been practically abandoned and low-temperature vacuum evaporation is now the usual practice. In the ordinary method of making sugar, the clarified juice is first evaporated to a thick syrup in some form of continuously operating vacuum evaporator; the evaporator usually operating in what is termed "multiple effect" and the juice as it concentrates passing forward and being subjected to successively lower vacua and temperature in successive effects. That is, while the first effect may be operating on thin juice at nearly atmospheric pressure, the final effect will operate on the concentrated juice or syrup at a low temperature. The syrup is finally evaporated to grain (that is, crystallized) in a strike pan, or discontinuous type of vacuum evaporator treating a body of liquid. In this pan, a portion of liquid is evaporated until crystals form and then these crystals are built up or enlarged by regulated additions of more liquid. The final product consists of a body of crystals and molasses which is separated in a centrifugal machine. The pressure, and consequently the temperature, in this boiling pan are held as low as possible during this operation.

The sugar separated in the centrifugal from the boiled product is what is called " first sugars." The molasses on reboiling in the same manner yields further a crop of " seconds " sugar of lower grade. It is, of course, desirable to recover as much of the sugar as possible as first sugars; that is, to recover as large a crop of crystals as possible in the first concentration. These crystals should be as nearly as possible of uniform size since this gives a better grade product and purges or separates better in the centrifugal. (In the sugar-boiling operation it requires considerable skill to prevent occasional starting of new crops of crystals, or " false grain " of less size than the older crystals.) With false grain present in the masse cuite, the masse does not purge well in the centrifugals since the smaller crystals of the false grain tend to clog up the spaces between the crystals of the regular grain and render extrication of the molasses difficult and tedious. Where the false grain contains minute crystals these are apt to pass through the centrifugal meshes and join the molasses, from which this sugar must subsequently be regained. In washing the purged sugar, furthermore, small crystals, such as those of false grain, suffer more loss by solution in the washing fluid. In these evaporating operations of the prior art it will be noted that the saccharine juices are progressively subjected to lower and lower temperatures as concentration increases. It will be also noted that by the ordinary method the syrup when boiled to grain in the strike pan is in contact with the heating surface for several hours and although the temperature is relatively low the danger of alteration is great on account of the time. In my process I am able almost instantly to carry the dehydration to about 10% of water or even less and I then cool continuously and progressively; the crystals forming regularly as the cooling takes place.

It has been mentioned in the beginning that the difficulties met up to the present time in the application of this process to the crystallization of sugar were, on the one hand, the danger from the high temperature, and, on the other hand, the difficulty of obtaining a regular grain. The first of these difficulties is very serious when the operation is not continuous. It is well recognized that syrup may be heated to a high temperature without damage, provided this condition be not maintained too long; but it is not safe if the high temperature be maintained for a long time. Since the boiling point of sugar syrup at atmospheric pressure is in general above 100° C., if it should be desired to carry the dehydration to 10% of water, the temperature of boiling for second syrups may reach 120° C.

I have discovered that the supposed great risk of high temperatures in concentrating sugar liquids is in large part erroneous; and based upon this fact, I have devised a simple, cheap and ready method of crystallizing and recovering sugar, yielding a larger crop of first sugar in the form of uniform large, well developed crystals of any desired size. With such crystals, losses in purging and washing are minimized.

High temperatures are not necessarily injurious to sugar liquids provided the time during which they are exposed to such temperatures is but short. Even dense, highly concentrated liquids may be momentarily exposed to temperatures considerably in excess of 100° C. and going as high as 130° C. The time should, however, not be much more than a couple of minutes and is preferably much less. This short period of time is, however, amply sufficient for my present purposes. Time of exposure and sheer temperature are in some degree reciprocal factors. With the aid of such high temperatures, sugar liquids which have been concentrated as far as practicable in the ordinary form of multiple effect evaporators operating under low temperatures can be given a still further concentration, and such concentration is effected in the present process. In the multiple effect evaporators of the usual types, concentration beyond a heavy syrup is not ordinarily practicable; firstly, because the density, at the low temperatures employed, rapidly increases and renders circulation difficult and, secondly, because of the formation of crystals. But by taking this dense, heavy syrup and quickly raising its temperature many degrees, its fluidity much increases while its tendency to deposit crystals decreases, and in this heated condition it can be easily circulated in film evaporators of suitable type and its concentration pushed much further. That this is not usually done is due to the current impression that such high temperatures will be injurious. But they are not, provided they are not prolonged.

Ordinarily I prefer to raise the temperature considerably above 100°, and particularly in the heating elements. High temperature in the heating elements is advantageous since the greater the temperature differential between the heating element and the liquid to be heated, the greater is the amount of heat which can be transferred in a time unit. The temperature of the liquid is also preferably maintained above 100° C. and the pressure within the evaporator may be greater than that corresponding to 100° C., that is, greater than atmospheric pressure. The pressure of the vapor from a concentrated sugar solution boiling above 100° may of course be no greater than atmospheric pressure or may be less, according to the conditions. But it is preferable to maintain some degree of plus pressure; that is, pressure above the atmospheric pressure. Under these conditions and with these temperatures, the liquid very quickly loses most of its water; and, with the proper form of apparatus, this extra evaporation can be so rapidly performed at such temperatures that sufficient time to damage the sugar is not afforded. Such apparatus is preferably employed. While many types of transit evaporators may be employed, (being operated under high temperature) for this purpose, I much prefer the climbing and descending film type shown in my application, Serial No. 319,386; in which a body of liquid is converted into a mass of liquid and vapor ascending through a relatively narrow heated tube or tubes and then into a descending film of liquid passing downward through a similar tube or tubes under the influence of the body of vapor. In this type of evaporator, the surplus water can be removed from the sugar syrup at such a rapid rate that the sugar is not given time to alter or change to any detrimental extent, and the type is, therefore, well adapted to the present purposes.

In the embodiment of my invention at present preferred, the concentration is carried so far and the finishing temperatures are maintained at so high a point that the sugar is gradually and insensibly converted from a state of solution, as the water evaporates, into one of fusion. That is, in the product discharged from the high temperature evaporator, the sugar may be substantially a molten or semi-molten body, carrying but a few per cent. of moisture, say 3 to 10. The presence of this small amount of water, of course, lowers the fusion temperature of sugar materially. In a way the product may be said to be a solution of water in molten sugar—rather than of sugar in water. This temperature is not dangerous if it only lasts for a few minutes, but when the operation is not continuous, the syrup is maintained at this high temperature for a considerable time in the evaporator itself or in a heated vessel, and it is at this time that decomposition sets in. If the operation be performed with a continuous evaporator, but if the crystallization should not be continuous, the hot syrup must be stored in the crystallizer before beginning the cooling operation, and the syrup therefore remains during a considerable time at a dangerous temperature. In the continuous apparatus, on the contrary, the syrup remains for about a minute in the evaporator. It then enters the crystallizers, where it immediately begins to cool progressively, and wherein no dangerous temperature prevails.

From the point of view of regular grain formation, the continuous operation presents great advantages, for when the apparatus is once regulated, the cooling conditions are always the same, the same work being done, while with irregular cooling, it is not the same. With this hot dense material it is necessary to reduce the temperature for a number of reasons. Maintenance of the high temperature would be injurious to the contained sugar, while it is difficult to rapidly cool solid or semi-solid material of this nature as a body. Furthermore, crystallization of sugar begins at a temperature even above 100° C. and at a temperature the higher the purer the material; that is, the greater the amount of sugar therein. As this hot material cools, therefore, crystallization is apt to set in and this crystallization is likely to be irregular and to result in the formation of a powder rather than the desirable large grain. With the pure materials used in making first sugars, it is usually, therefore, necessary to maintain the temperature somewhat above 100° C., to prevent quick crystallization; that is, to maintain the temperature within the danger limits. In whatever manner this material be treated as it comes from the pan, it is rather difficult to obtain a good and uniform crystallization without the use of special expedients. This material coming from the evaporator, however, may be used as such for any other purposes for which it is applicable without endeavoring to produce special types of crystallization therein.

In developing the idea of continuous operation, I have discovered the advantages of this method. The first of these improvements was in the means of cooling the crystallizers. In observing the action which takes place in the ordinary crystallizers in which masse cuite is cooled by a current of cold water passing through the double bottoms or through the curved arms of the mixer, I have been able to discover the cause of the formation of fine crystals alongside of the crystals which develop normally. This formation of secondary crystals comes simply from the irregular cooling of the mass. This mass is viscous, thick and conducts heat with great difficulty.

The mixing arms which are designed to equalize the temperature throughout the mass accomplish their purpose in an imperfect manner on account of the lack of fluidity of the mass, and because those particles which remain in contact with the cooling surface are cooled very rapidly, resulting in the production of very fine grains. If the cooling were equal throughout, a perfectly regular grain would result. The crystals would be built up regularly instead of forming fine grain next the normal crystals.

I have found that the ideal conditions may be approximated by cooling in crystallizers provided with suitable mixers, provided the cooling surfaces are always maintained at a temperature very little lower than the temperature of crystallization, thereby avoiding sharp temperature differentials between different portions of the mass. This necessitates of course very large cooling surfaces, such for example as the mixers designed by Ragot & Tourneur or some other system approaching this in principle. This method of cooling consequently demands, if the instillation be not continuous in type, that the temperature of the cooling water be constantly lowered as the operation goes on, but in the continuous crystallization under the present invention this condition is very simply fulfilled by circulating the cooling agent in a direction opposite to the advance of the crystallizing mass, that is to say, by running countercurrent, as will be described.

The second improvement is to reduce the temperature of crystallization. I have said that the crystallization of the concentrated syrups of the present invention begins in general at a temperature above 100° C., depending on the amount of dehydration. This temperature is higher the purer the syrup. For example, beet syrup having a purity of 92 concentrated to 92° Brix will begin to crystallize at about 115° C. To obtain distinct crystals instead of powdery crystals it is necessary at the beginning to cool very slowly, and during this time the temperature will be above 100° C., that is, at a dangerous point. In producing crystals from this mass under the present invention, a useful process, designed to remedy the foregoing difficulty, is to mix the hot dense molten material at once with a mother liquor. This mother liquor may be molasses from the centrifugals, produced at a later stage of the operation, or it may be mother liquor from one of the crystallizing stages, or it may be other forms of concentrated sugary liquid. Fresh syrup is less suitable. Whatever the solution employed, it is usually necessary that so far as the dissolved solids are concerned it be of less purity than the material coming from the pan. If desired, this liquid may contain suspended or floating crystals which will serve as nuclei for the growth of grain; that is, crystals which will serve the purpose of what are known as "seed crystals".

I may mix some centrifugal molasses with the syrup as it comes from the evaporator, and this may be done continuously by means of a pump delivering to the discharge pipe of the evaporator. The material, therefore, which enters the first crystallizer is a mixture of the two liquids. Instead of adding the molasses, it may be preferable to add a portion of the mass which is itself undergoing the crystallizing operation and which contains crystals adapted to act as seed crystals. The pump then instead of drawing from the molasses tank draws directly from one of the crystallizers. The result of these operations is that the mixture of the two liquids has a lower purity than that of the unmixed molten material and that its temperature of crystallization is lowered. The greater the proportion of molasses or mother liquor added, the lower will be the temperature of crystallization.

If the material delivered by the evaporator have a purity of 92, for example, and if an equal weight of molasses having a purity of 75 be added, the purity of the mixture will be $$\frac{92+75}{2} = 83.$$

The temperature of crystallization of this mixture will be lowered about 10° C., which is also important. But at the same time that the temperature of crystallization of the mixture is lowered, the actual temperature of the mixed material becomes the mean temperature of the two liquids. I have in this process a means of cooling instantly to the desired temperature of crystallization. If the syrup leaves the evaporator at 118° C., and if I mix an equal weight of molasses at 50° C., the mean temperature will be $$\frac{118+50}{2} = 84.$$

If, on the other hand, the product from the pan has a temperature of about 118° C. and is mixed with an equal amount of mother liquor of about 82° C., the average temperature of the mixture will be:

$$\frac{118+82}{2} = 100.$$

The temperatures of the mixtures in the examples given may be lower than the temperature desired for crystallization, in which case heating means may be used to reheat the mixture to the desired temperature for crystallization.

By varying the temperature of the molasses or mother liquor and the proportion of the same mixed with the product of the pan, any desired temperature and coefficient of purity can be attained; that is, the commencement of crystallization can be regulated, and the mixture discharged into the crystallizers will be at the desired temperature and crystallizing point within certain limits. The mother liquor or liquor from the crystallizers or molasses thus mixed with the described product of the pan affords a liquid medium and allows crystallization to take place with the regularity which can only be attained in fluid mixtures. In a molasses from a centrifugal in which the utmost possible crystallization has already taken place, it will not take up, dissolve or restrain from crystallization, the sugar in the pan product going into the mixture, and full opportunity is, therefore, afforded for a maximum production of crystallized sugar from such pan product, whereby a material increase in the amount of first sugars is afforded over the common procedure. The advantage thus obtained in mixing a portion of the pan product with the diluting liquid is quite important.

First: I may thus obtain the "*pied de cuite*" (seed crystals). There may be in the liquid taken from the crystallizer sugar in fine crystals, and it is preferable to use these fine crystals to build up the grains instead of throwing down fine sugar by allowing the pan product to crystallize directly. It is besides preferable from every point of view that the crystallization should be made in the presence of the "*pied de cuite*" (seed crystals) because a much more regular product is obtained in this way.

Second: The mother liquor which surrounds the fine grains formed in the crystallizer is at a purity sufficiently reduced so that by its admixture in a sufficient volume with the initial pan product I can obtain a purity properly lowered to allow the crystallization in the pan product to take place at normal temperatures. The temperature of the mixture will be about the temperature of crystallization.

The mixture of dense material from the pan and diluting liquor, whatever its source should be slowly and progressively cooled, the cooling agent used in each stage of the operation being but a few degrees lower in temperature than the mass to be cooled. Operating in this manner, the crystallization is slow and regular and the crystals regularly built up, without the production of false grain. The original crystallization should be started comparatively hot and the final crystallization finished at a comparatively low temperature.

As the cooling agent, the syrup from the multiple effect feeding the final hot pan may be usefully employed being sent successively through all the crystallizers as it will leave the last crystallizer very hot and at a temperature suitable for introduction into the described concentrating pan. Other liquids may, however, be employed. In one of the accompanying drawings I have shown the diluent taken from an intermediate crystallizer. It might be taken from any of the others. If it were taken, for example, from the last, the purity of the diluted mixture would be lowered to the maximum extent with a minimum volume of admixture. The reverse will be true if the diluent be taken from the first crystallizer in series. The greater the amount of diluent liquid mixed with the concentrated products from the finishing pan the lower the temperature of the mixture and also the temperature at which grains begin to form.

With every degree drop in the temperature of the hot mixture of diluting liquor and dense product, a fresh portion of sugar crystallizes out regularly from the magma or mixture upon the grains already formed, building them up. Any violent temperature change which would result in a new crop of crystals or false grains is avoided. By this slow and progressive lowering of the temperature, the crystals can be built up to any size desired and will be uniform in grain. In this operation it is desirable that the magma be stirred or agitated. The stirring, which should not be violent enough to break the crystals, is necessary to permit a regular growth. As each crystal forms and grows, it depletes the liquid in its immediate vicinity of sugar and it is necessary that the liquid around the growing crystals should circulate to some degree to feed the crystal. As the temperature progressively lowers, however, stirring mechanism of different types must be employed since the magma becomes stiffer and stiffer, requiring more powerful mechanism. The first stirrer used in the hot magma may preferably combine a stirrer and a cooler, using a system of rotating cooling pipes. In the final stages, cutting stirrers are often necessary.

In the ordinary mode of operation, in which concentrated sugar juice is boiled down en masse in the pan, extreme care and skill are required to start the grain, to continue its growth and building up without the formation of false grains at any time, and to produce an utmost or exhaustive crystallization of first sugars from the masse cuite. In the present operation, all this necessity for care and skill is substantially obviated, the personal equation of the sugar boiler being eliminated and the crystallization may be substantially automatic and self-regulating. In the present invention, as it will be seen, the semi-syrup from the last vacuum effect, which ordinarily would be slowly and methodically boiled down in the pan, is rapidly evaporated past the point of crystallization to form a mass containing but very little water and this mass is then allowed to yield sugar slowly and methodically in a diluting liquor from a later operation. With proper regulation of the amount of admixture of liquor and dense mass, of the progress of cooling counter-current and other easily adjustable conditions, the operation of building up a uniform, large sized, advantageous, crystallized grain becomes almost automatic.

The process forming the subject of my invention may be carried out in various forms of apparatus, all of which employ, however, finally a high pressure evaporator which may be of any construction in which the material under treatment, sugar solution, for instance, is evaporated and subjected to such a high degree of heat as to be substantially molten or semi-molten when discharged. In such condition, the sugar solution is usually of too high "purity" to properly crystallize upon discharge to coolers or crystallizers, and means must be provided for reducing this "purity."

In the accompanying drawings, I have shown forms of apparatus which may be employed in carrying out my improved process, in which:

Figure 1, is a view in elevation, largely diagrammatic, of a simple form of apparatus which I may employ; Fig. 2, is a sectional view on an enlarged scale of a high pressure evaporator employed in connection with apparatus in which my improved process may be carried out; Fig. 3, is a diagrammatic view of another form of apparatus in which the process may be carried out, showing a number of auxiliary elements and a series of cooling vessels in which the sugar solution is methodically crystallized; Fig. 4, is a similar diagrammatic view illustrating another form of apparatus in which my process may be carried out; Figs. 5 and 6, are views of an apparatus having a modified form of coolers or crystallizers; Figs. 7, 8 and 9, are diagrammatic views illustrating another form of apparatus in which my improved process may be carried out, having an element for heating or cooling the dehydrated sugar product prior to its passage to the crystallizing vessels, and Figs. 10 to 17, both inclusive, are views of stirring and cooling devices for use in connection with the apparatus employed in carrying out the process of my invention.

In Fig. 1, I have shown a simple form of apparatus capable of carrying out the process forming the subject of my present invention. In this form of apparatus, I provide a high pressure evaporator of the traveling film type, such as disclosed in my Patent 965,822, dated July 26, 1910, the steam shell of which is indicated at 1 in the accompanying drawings. The chamber in which the finished liquor is separated from its accompanying vapor is indicated at 2, and through this chamber the liquor to be evaporated is passed by means of a pipe 3, under the influence of a suitable elevating apparatus, such, for instance, as the pump indicated at 4, the function of such pump being simply to elevate the liquid to such point in the uptake tubes of the high pressure evaporator as to insure the desired ebullition under the influence of heat, steam, for instance, being supplied to the shell at 5, to cause the liquid to climb in said tubes, film coating the latter and overflowing into a chamber at the upper part of the shell for passage to a second set of tubes for downward passage, in which tubes the flow and concentration is facilitated by the vapor accompanying the rising film or column of liquid. From the tubes in which the liquor descends the latter passes in a superheated state through a discharge outlet or nozzle 6 to a crystallizing vessel 7, illustrated in the accompanying drawing as having a mechanically operated stirrer or agitator 8, and a liquid jacket 9 for the passage of a cooling medium in order that the liquor discharged may be cooled sufficiently to commence crystallization; the crystallized mass being subsequently discharged into a centrifugal indicated at 10, wherein the molasses is separated from the sugar crystals in the ordinary and well known manner. The cooling medium may be water introduced into the hollow wall of the cooler or crystallizing vessel 7, or it may be liquor delivered from a triple effect, at the desired temperature, (being either heated or cooled as may be desired) which is to be subsequently passed to the high pressure evaporator for further concentration and then discharged into said crystallizing vessel. Whatever the particular means adopted for cooling, the cooling operation must, as stated, be progressive. The molasses or mother liquor separated from the crystallized mass by the centrifugal is caught in a receptacle or well 11.

Under usual conditions the sugar material discharged from the high pressure evaporator is of too high "purity" to properly crystallize, and if run into a cooler directly will crystallize too rapidly unless great care be exercised, forming an irregular grained mass. To avoid this undesirable result, I propose to reduce the "purity" of the sugar product discharged from such evaporator, and for this purpose I preferably admix therewith a sugar containing liquid of less purity than such sugar solution. This material may be of varied character, but in one embodiment of the present invention I may use a portion of the liquid or molasses separated by the centrifugal from the crystallized mass delivered from the cooler. This liquid is carried through a pipe 12 leading from the well 11, and is delivered to the discharge nozzle 6 for admixture with the hot product by means of a pump 13. I may admix a portion of the thin liquor, which may have been employed as the cooling medium for the crystallizable mass where it is desirable to reduce the density more than can be done with molasses. The purity reducing material may come from the liquor in one of the crystallizing vessels. For these purposes I provide by-passes 14 and 15, one leading from the cooler or crystallizing vessel 7, and the other from the jacket 9 of said vessel to the pipe 12; said pipe 12 and the by-passes being suitably valved at 16, 17 and 18, in order that I may use any of the stated materials as the "purity" reducing agent. If syrup is used for cooling, it may be tapped off from the bypass 15. In all instances, the particular point of tapping off the purity reducing material depends upon the stage of crystallization along the length of the crystallizer.

In Fig. 2, of the drawings, I have shown an enlarged sectional view of the high pressure evaporator. This structure is substantially the same as the apparatus shown in my patent to which reference has been made.
The pipe 3 through which the liquor is conveyed to this evaporator under the influence of the pump 4 communicates directly with a chamber 20 from which tubes 21 extend within the shell 1, in which tubes the liquor is preliminarily vesiculated and finally climbs as a film under the influence of the vapor produced therefrom, by the heating medium introduced to such shell at the point 5. The liquor discharged from said tubes 21 enters a chamber 22 at the top of the shell and from such chamber overflows into tubes 23 in which it descends, in the form of a falling film, the vapor accompanying the liquor serving to cause the descending column to thoroughly wet the walls of said tubes and completely film line the same, whereby concentration of the same is facilitated. The concentration in this form of apparatus is so rapid, that the actual time in which the liquor remains in the tubes 21 and 23, from the time it enters the same from the pipe 3 until discharged through the outlet 6 to the cooler 7 in which crystallization takes place, is generally not greater than two minutes; the liquor in the meanwhile being heated to such a degree as to be discharged as a substantially molten or semi-molten mass of sugar solution often containing less than ten per cent. of water and in many instances considerably less. It may of course be less concentrated, but high concentration is advantageous.

In the form of apparatus shown in Fig. 3, I have shown the same elements as indicated in Fig. 1, with certain additions whereby the carrying out of my improved process is facilitated, and whereby I am enabled to secure a better progressive cooling and a more methodical crystal formation. In this type of apparatus, the liquor before it passes to the tubes 21 of the high pressure evaporator may be passed to a preliminary heater 24, which may be heated by the condensation from such evaporator passing through a pipe 25. From this high temperature evaporator the superheated sugar solution passes to the first cooling vessel, indicated at $7^a$, such solution having had its "purity" reduced before entry thereto after the manner I have described with respect to the operation of the apparatus shown in Fig. 1. The vapor from the concentrated product separated in the chamber 2 may be passed through a conduit 26 to the first pan in series, A of a multiple effect in which preliminary treatment of the liquor subsequently treated in the high pressure evaporator takes place, the thin liquor entering the pan A at 27; or these vapors may be used elsewhere. This thin liquor is subsequently treated in the succeeding pans B and C, the vapors thereby created passing to the heat zones of such pans in the usual manner, and said pans are operated under successively increasing vacuum.

In the form of the apparatus shown in Fig. 3, crystallization takes place in a series of coolers and crystallizers, indicated respectively at $7^a$, $7^b$, $7^c$ and $7^d$, the sugar solution passing successively through these and finally to a vessel 28, in which it may be quickly heated to a temperature somewhat higher than it possessed upon leaving the vessel $7^d$, and from said vessel 28, the material passes to the centrifugal 10, the preliminary heating in the vessel 28 being desirable to prepare the solution in a proper state for purging by the action of such centrifugal.

It is desirable, as stated, that the cooling be progressive and very gradual and in order that the crystallizing sugar solution passing through the coolers $7^a$, $7^b$, etc., may be so progressively cooled, I may employ as the cooling medium the warm syrup discharged from the pan C of the triple effect which may be termed "semi-syrup," such liquor having been lowered in temperature by any suitable means if necessary until substantially at or about 40° C. Such liquid may be drawn through the temperature exchanging means of the several coolers by the pump 4 so that when it reaches said pump it is at a temperature sufficiently high to pass directly to the high pressure evaporator through the pipe 3, without preliminary heating in the vessel 24, and for this purpose I may provide a by-pass 29 with a valve 30 whereby the heating element 24 may be cut out when desired.

The cooling must, as stated, be progressive and gradual and to obtain this effect it is desirable that the cooling agent for the first crystallizer in series be not much cooler than its contents which necessarily results in the cooling agent discharged from the said crystallizer being rather high in temperature.

In lieu of employing the liquor from the triple effect as a cooling agent, water at the desired degree may be used as the cooling medium, being subsequently disposed of in any desired manner. In this form of the apparatus, it is desired, of course, to reduce the purity of the sugar material discharged from the high pressure evaporator, and for this purpose I may return thereto a portion of the liquor discharged from the centrifugal, through a pipe $12^a$ by means of a pump $13^a$. In lieu of this and preferably I may employ a liquor from one of the crystallizers and containing suspended crystals. To this end I may take from any of the coolers $7^a$, $7^b$, etc., a portion of the material therein through pipes $14^a$, $14^b$, $14^c$ and $14^d$, communicating with crystallizer at any desired point which communicate with the pipe $12^a$. The pipe $12^a$ and the pipes $14^a$, $14^b$, etc., will be provided with valves 16 and 17, respectively, whereby diluent material from either the molasses well or from any crystallizer may be passed to the discharge outlet 6 of the high pressure evaporator for admixture with the dense material, as may be desired. It will be understood also that the thin sugary liquor from the jackets of the cooling vessels may be employed as the purity reducing material; pipes $15^a$, $15^b$, etc., valved at $18^a$, $18^b$ &c., being employed for passage of the same to the pipe $12^a$, as in the structure shown in Fig. 1.

In Fig. 4 I have shown a further form of apparatus in which my improved process may be carried out. This structure is substantially the same as that illustrated in Fig. 3, except that instead of employing jacketed coolers as heat interchangers I may provide such form of apparatus with a series of tubular stirrers 35 containing a cooling medium, which may be water or the liquor to be subsequently passed through the high pressure evaporator. These stirrers are rotated by any suitable means so that the mass of crystallizable sugar material in the coolers may be properly agitated, and any suitable means may be employed for driving such stirrers that will insure the passage of the cooling medium from one stirrer to the next in such manner as to produce the desired methodical slow cooling. As in the structures shown in Figs. 1 and 3, the cooling medium flows counter-current, that is to say, the cooling medium first enters the cooler $7^d$ while the hot sugar solution first enters the cooler $7^a$. The cooling of the material must, as stated, be progressive and methodical and it is desirable that the operation be so conducted that the contents of each of the crystallizing vessels will be methodically cooled as it progresses from one end to the other. The same means for supplying the "purity" reducing material to the discharging sugar solution as shown with reference to the structure shown in Fig. 3, may be employed in this form of the apparatus.

In Figs. 5 and 6, I have shown a somewhat modified form of apparatus in which a series of coolers disposed in somewhat different form from those shown in the other figures of the drawing, though not differing in method of operation, are shown. In this form of the apparatus, the arrangement of the high pressure evaporator and multiple effect is substantially identical with that shown in Fig. 3. The sugar solution flowing from this evaporator passes to a cooling vessel $7^{aa}$ in which a rotating stirrer, comprising a series of tubular arms 37 carried by a central shaft 38 having hollow ends and driven in any approved manner, is employed. This form of cooling stirrer is shown in Figs. 10 and 11. From the cooler $7^{aa}$ the crystallizing mass passes to the cooler $7^{bb}$ in which may be located the same form of stirring means, both of which stirrers are supplied with a cooling medium which may be of any of the materials heretofore mentioned for performing that function, passing counter-current to the flow of the crystallizing mass. From the cooler $7^{bb}$, the crystallizing mass passes successively to the coolers $7^{cc}$, $7^{dd}$ and $7^{ee}$, and from the latter it enters the heating vessel 28 from which it is discharged into the centrifugal.

In the coolers $7^{cc}$ and $7^{dd}$, the stirrers may be in the form of a rotatable tubular coil 39 carried by a shaft 40 with hollow ends communicating with said coil; the latter having vanes or blades 41 designed to move the mass in said coolers and with the aid of the counter-current cooling medium reduce its temperature progressively and insure the methodical and progressive crystal building. This form of cooling stirrer is fully shown in Figs. 12 and 13. When the mass of sugar solution reaches the cooler $7^{ee}$, it is of such a consistency as to preclude the use of a tubular cooling stirrer, and in this vessel I may provide a shaft 42 having a helical blade or vane 43 to agitate the mass, the vessel having a hollow wall or jacket 44 to which the cooling medium may be introduced at the point 45. This form of cooler and stirrer is fully shown in Figs. 14 and 15.

From the cooler $7^{ee}$, the crystallizing mass of material passes to the vessel 28 in which it is heated to a temperature somewhat in excess of that in the cooler $7^{ee}$, in order that it may be in proper condition for purging in the centrifugal, and if desired a further portion of molasses may be there added to the mass in order to reduce its density and thereby facilitate its purging in the centrifugal. In this vessel 28 I may employ a stirrer consisting of arms 46 mounted upon a shaft 47, and it may be jacketed for the reception of a heating medium introduced at 48, or it may be heated in any other suitable manner. This form of heating vessel and its stirring means are fully shown in Figs. 16 and 17.

It will be understood, of course, that some form of stirring means will be employed in the coolers or crystallizing vessels $7^a$, $7^b$, etc., shown in Fig. 3, and that such stirring coolers may be of the same type as those illustrated in Figs. 10 to 17, both inclusive.

In Figs. 7, 8 and 9, 1 represents the steam shell of a high temperature evaporator such as is described in my Patent No. 965,822. The syrup coming from a triple effect or other form of evaporating apparatus is passed only once through the evaporator. It is fed by a pump 4 through a heater 24, and then enters by the pipe 3 into the evaporator. It passes out continuously by a tube or nozzle 6 concentrated to the desired density. It may then pass through a tubular cooler 50 in which it is immediately cooled to a temperature one or two degrees above the temperature where it would begin to crystallize. Then it flows through a series of crystallizers $7^{a'}$ $7^{b'}$ $7^{c'}$ $7^{d'}$ and $7^{e'}$ arranged one below the other provided with double bottoms or other cooling arrangement and furnished with mixers. In these it is gradually cooled, the sugar crystallizing meanwhile, and finally the mass is brought to a centrifugal 10. Instead of employing the element 50 as a cooler, hot water or steam may be introduced to raise the temperature of the sugar solution passed thereto.

In Fig. 8 I have an installation of crystallizers such as have been described in Fig. 7, but they are shown provided with rotating coil mixers as in the apparatus of Ragot and Tourneur. In each coil the entrance of the cooling agent is made in the end opposite to the entrance of the mass to be cooled, and the exit of each coil is connected to the entrance of the next coil. If, with this arrangement I feed a cooling liquid into mixer $7^{d'}$ as shown, the cold liquid will circulate in a direction opposite to that of the mass to be cooled, and by the natural exchange of temperature, will establish the desired ideal condition; that is to say, that the cooling liquid will be progressively heated by the exchange of temperature and will be always in each crystallizer successively under the required conditions. In the crystallizer 7ᵃ′, which takes the syrup at the beginning of the crystallization, the cooling liquid will reach its maximum temperature. In this plan I have omitted the element 7ᵉ′, for it is not used as a cooler, but serves to prepare the masse cuite for the centrifugals, and it may be desirable to add a little molasses and to heat the mass to render it more fluid to make it purge more readily. To remedy this difficulty I may mix some centrifugal molasses with the syrup as it comes from the evaporator, as before referred to, and this may be done continuously by means of a pump 13 which draws a certain portion of the molasses from the well 11 and delivers it to the discharge pipe leading from the evaporator to the first crystallizing vessel. With this arrangement therefore, the syrup which enters the first crystallizer is a mixture of the two liquids.

Instead of circulating the molasses, it may be preferable to circulate the mass to be crystallized itself. The pump then instead of drawing from the well 11, may draw through a pipe 12 directly from one of the crystallizers, for example 7ᶜ′.

I claim:

1. The process of obtaining crystallized sugar which comprises evaporating a sugar juice to a highly concentrated non-crystallized state at a high temperature, such concentration being above that at which it would readily yield crystals at a lower temperature, admixing the hot concentrated material prior to the occurrence of crystallization with a sugar-containing liquid of less purity and allowing crystallization to take place.

2. The process of obtaining crystallized sugar, which comprises evaporating a sugar solution at a temperature and to a concentration at which the contained sugar is substantially molten, admixing the concentrated material with a sugar containing liquid of less purity and allowing crystallization to take place.

3. The process of obtaining crystallized sugar, which comprises concentrating a sugar solution, further evaporating the same at a temperature above 100° C. to a concentration at which the contained sugar is practically molten, admixing the concentrated material with a sugar containing liquid of less purity and allowing crystallization to take place.

4. The process of obtaining crystallized sugar, which comprises concentrating a sugar solution, further evaporating the same to a concentration of about ten per cent. of water at a temperature above 100° C., admixing the hot product with a sugar containing liquid and allowing crystallization to take place.

5. The process of obtaining crystallized sugar, which comprises mixing a hot concentrated sugar product containing a minimal per cent. of water and practically in a molten condition, admixing the same with a mother liquor and allowing crystallization to take place.

6. The process of obtaining crystallized sugar, which comprises producing a hot concentrated sugar product containing a minimal per cent. of water and practically in a molten condition, admixing the same with a diluent liquor containing suspended crystals and allowing crystallization to take place.

7. The process of obtaining crystallized sugar, which comprises producing a hot concentrated sugar product containing a minimal per cent. of water and practically in a molten condition, admixing the same with a diluent liquor and progressively cooling in stages, the cooling in each stage being performed with a cooling agent but a few degrees cooler than the mixture.

8. The process of obtaining crystallized sugar, which comprises producing a hot concentrated sugar product containing a minimal per cent. of water and practically in a molten condition, admixing the same with a diluent liquor, and progressively advancing the heated mixture against a counter-current of slowly progressing cooling agent.

9. The process of obtaining crystallized sugar, which comprises producing a hot concentrated sugar product containing a minimal per cent. of water and practically in a molten condition, admixing the same with a diluent liquor and progressively advancing the heated mixture against a counter-current of slowly progressing cooling agent, said cooling agent being a current of sugar-containing liquid to be heated.

10. The process of obtaining crystallized sugar, which comprises mixing a hot concentrated sugar product containing a minimal per cent. of water and practically in a molten condition, admixing the same with a diluent liquor from a later operation and allowing crystallization to take place.

11. The process of obtaining crystallized sugar, which comprises producing a hot concentrated sugar product containing a minimal per cent. of water and practically in a molten condition, admixing the same with a diluent liquor from a later operation containing suspended crystals and allowing crystallizaton to take place.

12. The process of obtaining crystallized sugar, which comprises producing a hot concentrated sugar product containing a minimal per cent. of water and practically in a molten condition, admixing the same with a diluent liquor from a later operation and progressively cooling in stages, the cooling in each stage being performed with a cooling agent but a few degrees cooler than the mixture.

13. The process of obtaining crystallized sugar, which comprises producing a hot concentrated sugar product containing a minimal per cent. of water and practically in a molten condition, admixing the same with a diluent liquor from a later operation, and progressively advancing the heated mixture against a countercurrent of slowly progressing cooling agent.

14. The process of obtaining crystallized sugar, which comprises producing a hot concentrated sugar product containing a minimal per cent. of water and practically in a molten condition, admixing the same with a diluent liquor from a later operation and progressively advancing the heated mixture against a countercurrent of slowly progressing cooling agent, said cooling agent being a current of sugar-containing liquid to be heated.

15. A continuous process for obtaining crystallized sugar from a sugar containing syrup, whch consists in dehydrating such syrup in a continuous evaporator to produce a molten product, discharging the dehydrated product into a series of crystallizers arranged in a battery, and cooling said product progressively in a continuous current.

16. A continuous process for obtaining crystallized sugar from a sugar containing syrup, which consists in dehydrating such syrup in a continuous evaporator and at a high temperature to produce a molten product, discharging the dehydrated product into a series of crystallizers arranged in a battery, and cooling said product progressively in a continuous current.

17. A continuous process for obtaining crystallized sugar from a sugar containing syrup, which consists in dehydrating such syrup in a continuous evaporator to produce a molten product, discharging the dehydrated product into a series of crystallizers arranged in a battery, cooling said product progressively in a continuous current, and arranging the cooling medium to flow counter-current to the flow of the crystallizing body.

18. A continuous process for obtaining crystallized sugar from a sugar containing syrup, which consists in dehydrating such syrup in a continuous evaporator and at a high temperature to produce a molten product, discharging the dehydrated product into a series of crystallizers arranged in a battery, cooling said product progressively in a continuous current, and arranging the cooling medium to flow counter-current in such a way as to produce in each successive crystallizer a temperature very little below the temperature of crystallization, such condition being due to the exchange of temperature which takes place between the cooling medium and the mass to be crystallized.

19. A continuous process for obtaining crystallized sugar from a sugar containing syrup, which consists in dehydrating such syrup in a continuous evaporator and at a high temperature to produce a molten product, discharging the dehydrated product in a series of crystallizers arranged in a battery, mixing with said product at the point of delivery into the crystallizers a liquid agent to diminish the purity of said dehydrated product, and cooling said product progressively in a continuous current.

20. A continuous process for obtaining crystallized sugar from a sugar containing syrup, which consists in dehydrating such syrup in a continuous evaporator to produce a molten product, discharging the dehydrated product into a series of crystallizers arranged in a battery, mixing with said product at the point of delivery into the crystallizers a portion of liquid material from any part of the battery of crystallizers in order to diminish the purity of said dehydrated product, and cooling said product progressively in a continuous current.

21. A process for obtaining crystallized sugar from a sugar containing syrup, which consists in continuously dehydrating such material to produce a molten product, discharging the dehydrated product into a crystallizer, varying the temperature of the dehydrated product to bring said temperature to a predetermined point before the product is passed to the crystallizer, and then cooling said product progressively in a continuous current.

22. A continuous process for obtaining crystallized sugar from a sugar containing syrup, which consists in dehydrating such material in a continuous evaporator to produce a molten product, discharging the dehydrated product into a crystallizer, varying the temperature of the product between the evaporator and the crystallizer to bring said temperature to a predetermined point, and then cooling said product progressively in a continuous current.

23. In the manufacture of sugar, the process which comprises producing a superheated fluid mixture of sugar with less water than is required for aqueous solution, supercooling to a temperature below the point at which crystallization becomes possible, and initiating such crystallization by the introduction of a sugary liquid carrying seed crystals.

24. In the manufacture of sugar, the process which comprises producing a superheated fluid mixture of sugar with less water than is required for aqueous solution, supercooling to a temperature below the point at which crystallization becomes possible, initiating such crystallization by the introduction of a sugary liquid carrying seed crystals, and continuing the cooling in a slow and regular manner till a maximum amount of building up of such seed crystals has occurred.

25. In the manufacture of sugar, the process which comprises producing a superheated fluid mixture of sugar with less water than is required for aqueous solution, cooling to a temperature sufficiently low to prevent injurious changes by diluting with a concentrated sugary liquid, and continuing the cooling in a slow and regular manner to permit the gradual building up of regular crystals.

26. In the manufacture of sugar, the process which comprises producing a substantially molten sugar containing but little water and free of crystallization, diluting with a concentrated sugary liquid and cooling by advancing the mixture against a countercurrent cooling agent, the cooling operation being performed in a plurality of successive stages with a minimal drop in temperature in each such stage, the lowering of temperature being made uniform throughout the mass of material in each such stage prior to the next cooling stage.

27. In the manufacture of sugar, the process which comprises producing a substantially molten sugar containing but little water and free of crystallization, diluting with a concentrated sugary liquid containing crystals adapted for building up and cooling by advancing the mixture against a countercurrent cooling agent, the cooling operation being performed in a plurality of successive stages with a minimal drop in temperature in each stage, the lowering of temperature being made uniform throughout the mass of material in each such stage prior to the next cooling stage.

In testimony whereof, I have signed my name to this specification, in the presence of two subscribing witnesses.

PAUL KESTNER.

Witnesses:
 EVERI CHARRIER,
 LEÓN PECKEL.